United States Patent [19]

Conti

[11] 4,409,062

[45] Oct. 11, 1983

[54] ROTARY BINDER

[76] Inventor: Paolo Conti, Via Neri di Bicci 14, Firenze, Italy

[21] Appl. No.: 329,027

[22] Filed: Dec. 9, 1981

[30] Foreign Application Priority Data

Dec. 10, 1980 [IT] Italy ................................ 9616 A/80

[51] Int. Cl.$^3$ ............................................ B32B 31/18

[52] U.S. Cl. ................................... 156/518; 156/519; 156/520; 156/522; 156/530; 156/552; 156/556

[58] Field of Search ............... 156/518, 520, 522, 530, 156/552, 556

[56] References Cited

U.S. PATENT DOCUMENTS

| | | | |
|---|---|---|---|
| 2,157,556 | 5/1939 | Menschner | 156/518 |
| 3,218,218 | 11/1965 | Bratt et al. | 156/530 |
| 4,196,035 | 4/1980 | Reil | 156/518 |

*Primary Examiner*—Caleb Weston

*Attorney, Agent, or Firm*—McAulay, Fields, Fisher, Goldstein & Nissen

[57] ABSTRACT

This invention discloses a rotary binder for applying gummed tape to continuous forms having perforated margins wherein two heads are mounted above and below the forms, and which heads rotate in synchronism in the same direction as a roller advancing the forms. The heads carry cooperating mechanisms having a trajectory equal to an integral multiple of the pitch of the perforation and which affix, cut and tear off a strip from a roll of gummed tape. The binder also includes mechanisms for unwinding the roll before forming the strip; mechanisms for stopping the roll before detaching the strip; mechanisms for causing the front of the strip to pass through one of the perforations and mechanisms for bending the tip of the strip and securing it to the bottom sheet of the form.

9 Claims, 2 Drawing Figures

ROTARY BINDER

FIELD OF THE INVENTION

This invention relates to a rotary binding device for applying strips of gummed tape to continuous forms used by tabulating machines.

BACKGROUND OF THE INVENTION

A binder associated with gummed tape strips for continuous forms is known which applies strips with a vertically moving head, whose vertical alternating movement is derived from rotating means used for the horizontal advance of the forms and which obtains strips from a continuous length of tape having a width equal to the length of the strips. The particular structure of this binder, its operational cycle, and the means adopted for the control of the motion, place a strong limitation on the speed of the head and, therefore, also on its efficiency.

The present invention has for its main object to remedy this drawback.

SUMMARY OF THE INVENTION

The invention solves the problem of applying, continuously, along each perforated edge of forms, equidistant strips of gummed tape by means of two superposed cylindrical heads rotating vertically so as to entrain, fix and cut off a piece of tape of the length of the strip, obtaining it from a continuous roll of gummed tape of a width equal to that of the strips, in cooperation with means for feeding the gummed tape in stretched arrangement and projecting it over the perforated edge of the forms, with means for the entrainment of the forms and with means for the bending of the strips against the bottom sheet of the forms.

The advantages obtained with the invention are: that a gummed tape of the same width as the strips is used; that each strip passes through a hole in the forms and the end of the strip is bent to close on the forms; that the binding tape is superposed tangentially to the perforated edge of the forms and at a speed equal to the speed of advance of the forms; that the binding is consistently effective, uniform; that the binding speed is very fast and the rate of production very high.

BRIEF DESCRIPTION OF THE DRAWINGS

These and further related advantages and characteristics of the invention will be better understood by those skilled in this art from the description which follows; and from the accompanying drawing showing the best mode thereof, and wherein.

DESCRIPTION OF THE PREFERRED EMBODIMENTS

Figure 1:
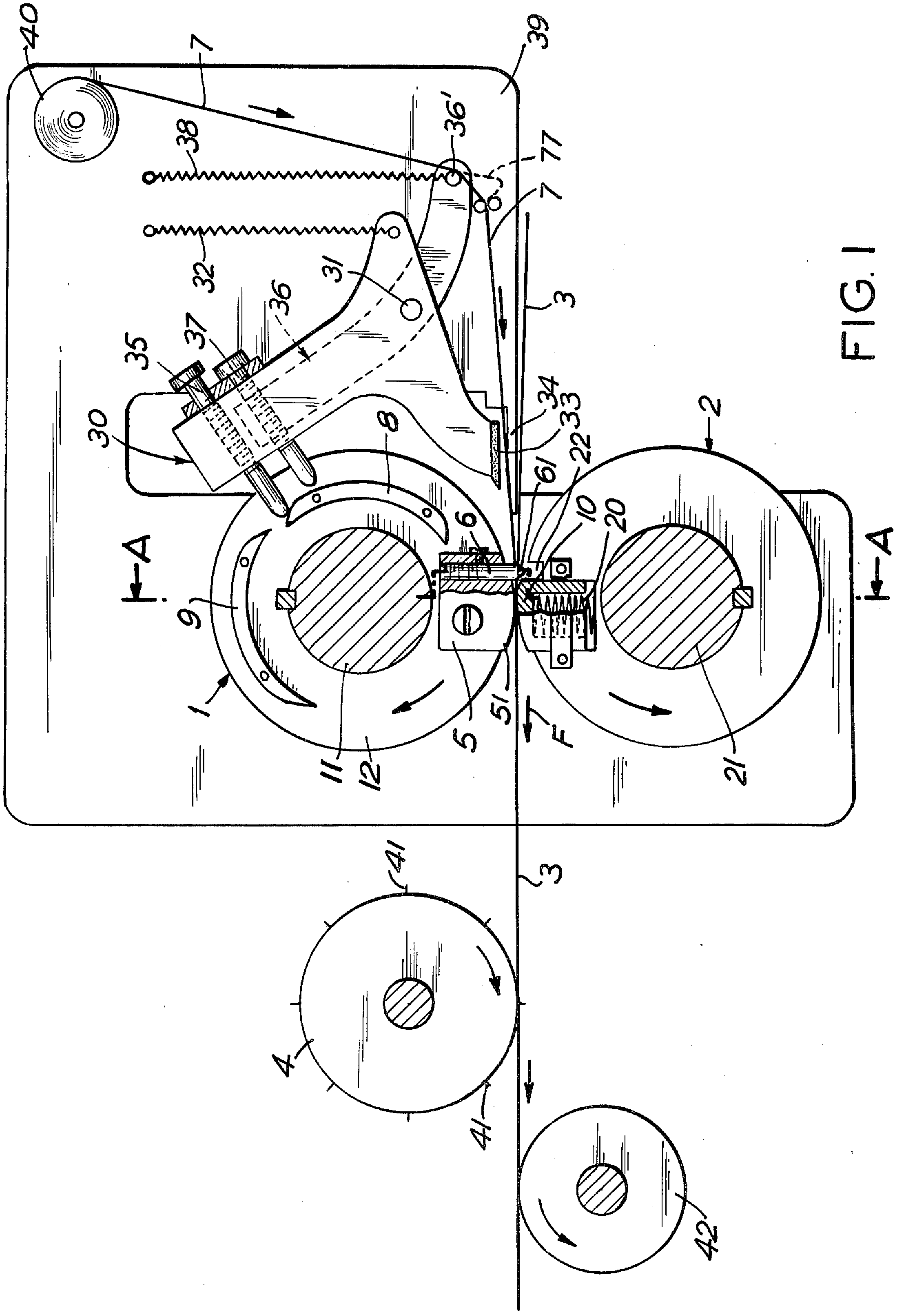
FIG. 1 represents a partly sectioned side view of a rotating binder unit according to one example of the invention; and, FIG. 2 is a sectional view taken along A—A of FIG. 1.
Figure 2:
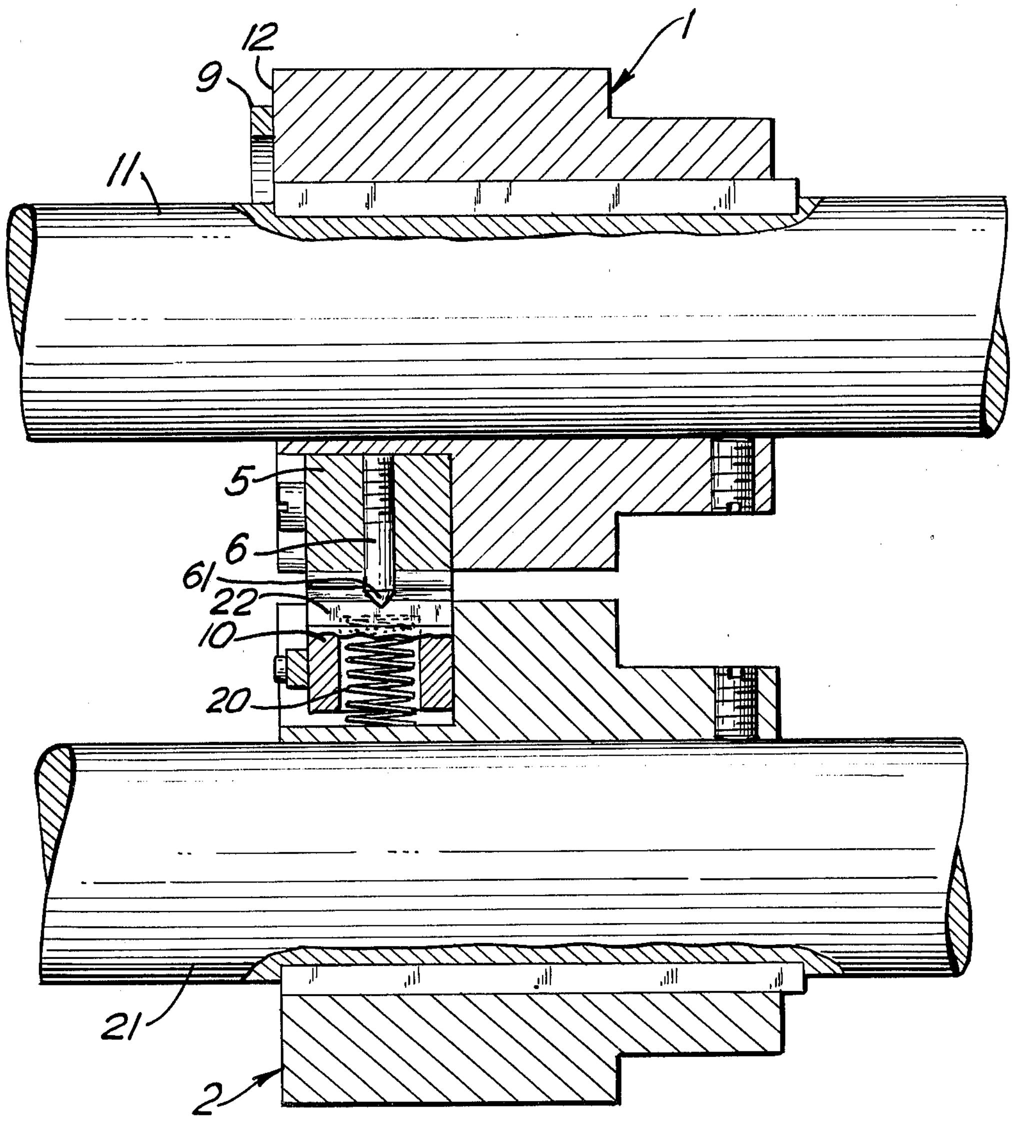

Broadly stated, the binder of this invention makes it possible readily to bind several superposed continuous forms by providing at each of the perforated margins of the forms, strips obtained from a continuous tape 7 of a width equal to that of the strips by means of a pair of opposite synchronized cylindrical head 1–2 (heads synchronized with each other), rotating vertically and symmetrically relative to the forms 3 with a motion relative to that of the rollers 4 driving the forms and in cooperation with a tape-stopping lever 30 and a tape-releasing lever 36. The head 1 is provided with a presser 5 and with a punch 6, and head 2 is provided with a presser 10 and a notch 22 which, with every revolution, are juxtaposed to the pressure 5 and punch 6, respectively.

With every revolution of the heads 1–2, a length of gummed tape is retained under the presser 5 and fixed on the form 3 moving between the heads 1–2, firstly pierced by the punch 6 and then torn off to form a strip. Thereafter, a tooth of the dragging roller 4 causes the front part of the strip to pass through one of the holes in the margin of the form 3, and a small roller 42 under the form 3 bends the tip thereof, fastening it to the lower page of the form.

In greater detail, and with reference to the annexed drawing, a rotating binder unit for applying gummed tape stitches to multi-sheeted continuous forms of tabulating machines according to the invention comprises:

A first circular head 1 having a circular rim, and mounted for rotation on a horizontal shaft 11, perpendicularly to the perforated edge of forms 3 in a position above and very close to the horizontal sliding plane of the forms 3, rotating in the same direction as the forms 3 and at the same peripheral speed.

Mounted on the first head 1 is: a radial, fixed presser 5, whose free end 51 is cylindrical and concentric with the head 1, the free end 51 protrudes slightly beyond head to permit fastening the gummed tape stitch to the top sheet of the form 3. Also mounted on head 1 is a radial punch 6, secured to the back of the presser 5, whose prismatic end 61 protrudes slightly from the presser 5, ending in a straight but not cutting edge, of a length equal to the width of the gummed tape 7 and transversally thereto, for cutting the gummed tape at the end of the strip, thereby facilitating its detachment by tearing.

A first cam 8 is secured on side 12 of head 1 for controlling the raising of a tape-stopping lever during the advance of the gummed tape 7 in the strip step.

A second cam 9 is secured in the same side 12 of the head 1 for controlling the raising of a gummed tape releasing lever in the step which precedes the formation of the strip.

The binder also includes a second head 2 with a circular rim, identical with first head 1, opposite and below it, mounted on a shaft 21 parallel to shaft 11 of head 1 positioned also below and very close to the plane of the forms 3, rotating in the same direction of advance as the forms and at the same peripheral speed the head 2 is synchronized with the first head 1 and both heads 1–2 rotate in synchronism with the toothed rollers 4 which move forms 3. Mounted on the second head is a radial, sliding presser 10 actuated by expansion spring 20, and whose free, cylindrical end is concentric with head 2 and projects slightly therefrom, for retaining the form 3 while the presser element 5 of the head 1 to which it is opposed applies the binding strip.

A peripheral, longitudinal notch 22 is provided in back of the presser 10 and opposite the punch 6 of the head 1 for cooperating in the cutting of the gummed tape 7 by the punch 6.

Also provided is a first bent lever 30, articulated on a pin 31 secured to a plate 39 which pin is parallel to the shafts 11 and 21. Lever 30 has a rubber foot 33 grazing the gummed tape 7 in the zone above a fixed horizontal sill 34 on which the gummed tape 7 travels, and with a screw stem 35 indexing with the cam 8 and further interlocked with an extension spring 32 for stopping the gummed tape when the screw stem 35 is not intercepted by the cam 8 and contrariwise, for liberating the tape 7 when the stem 35 is raised by the cam 8.

A second lever 36 is articulated on pin 31 and provided with a pulley 36' for interception of the gummed tape 7 and with a screw stem 37 indexing with the cam 9 and further interlocked with an extension spring 38 with the function of pulling from the roll or spool 40 a length 77 of tape 7 when the cam 9 raises the stem 37.

The binder of the invention operates as follows:

While by their rotation the toothed rollers 4 take the continuous forms 3 along in uniform motion in the direction of the arrow F, with every revolution of the heads 1–2, the lower end of the lever 36 which is controlled by the cam 9 descends, pulling a length 77 of gummed tape from spool 40; subsequently the foot 33 of the lever 30 which is controlled by the cam 8 lifts up, allowing the part of the tape 7 which is near the head 1 to stay under the presser 5 of the head 1. The presser 5, in cooperation with the presser 10 of head 2, takes along a length of tape 7 with the form fastening it to the form 3; then, the head 61 of the punch 6 notches the tape 7 so that as soon as the cam 8 lets go, the lever 30 and the foot 33 fall onto the tape 7 stopping it on the sill 34; the tape tears off, forming the strip. Subsequently a tooth 41 of the first roller 4 which is downstream of the head 1 inserts the front portion of the strip which is above one of the holes in the margin of the form 3 into said hole. Finally a small roller 42 below and tangential to the form 3 bends the head of the stitch which protrudes from said hole and applies it to the bottom sheet of the form to which it sticks.

In practice, the actual details of the invention may vary in equivalent manner as to form, dimensions, arrangement of the elements, nature of the materials used without otherwise going outside the scope thereof.

I claim:

1. A rotating binder for binding continuous sheets of a form having perforated margins comprising:
rotary means for moving said form along a given axial direction;
a rotary spool of gummed tape;
a first head mounted rotatably above said form and a second head mounted rotatably below said form;
said first and said second heads rotating in said axial direction in synchronism with one another and with said rotary means;
said heads carrying means having a trajectory whose development on said form is equal to an integral multiple of the pitch of the perforation and adapted to fix, cut and tear off a strip of tape obtained from said spool;
means for unwinding said spool before the formation of said strip;
means for stopping said tape before the detachment of said strip;
means for causing the front portion of said strip to pass through one of said perforations in the margin of the form; and
means for bending a tip of said strip and fixing it to the bottom sheet of said form.

2. Rotating binder according to claim 1, wherein:
said gummed tape has a width equal to that of the binding strip.

3. Rotating binder according to claim 1 or 2, wherein:
the first of said heads has a rim, a presser eccentrically secured to said rim and having a curved active surface tangential to said form;
a punch eccentrically secured to the back of said rim;
said punch having a straight tip perpendicular to said strip; and
screw means being provided for adjusting the positions of said presser and of said punch in relation to said rim.

4. Rotating binder according to claim 1, wherein:
said second head has a rim;
said rim mounting a radially slidable, spring-urged presser thereon;
said presser having a curved surface tangential to said form;
said surface being locatable periodically opposite said punch on said first head.

5. Rotating binder according to claim 4, wherein:
said pressers rotate at a peripheral speed equal to the speed of advance of the form.

6. Rotating binder according to claim 1, including shafts extending over the entire width of said form for supporting said heads of two operative units placed at two perforated margins of said form and being interlocked with a single control of the rotational motion.

7. Rotating binder according to claim 1, wherein said means for unwinding said spool includes:
a lever oscillatably mounted on a pin;
a pulley at one end of said lever;
said lever being operatively connected with return spring means and with screw means;
said first head having a first cam thereon;
said first cam being interlocked with said lever and with said screw means.

8. A rotating binder according to claim 7, wherein said means for stopping said tape includes:
a lever oscillatably mounted on said pin;
said lever having a foot at one end and being adapted to cooperate with a sill on which said form moves;
said foot being positioned to intercept said tape near said first head and said form;
said lever being operatively connected with return spring means and screw means;
said first head having a second cam thereon; and
said lever being interlocked with said lever and with said screw means.

9. Rotating binder according to claim 1 including pressers rotating at a per pherel speed equal to the speed of advance of the form.

* * * * *